United States Patent Office 3,013,144
Patented Dec. 12, 1961

3,013,144
ARC-WELDING APPARATUS
Floyd E. Adamson, Kenmore, and Harry J. Bichsel, East Aurora, N.Y., assignors to Westinghouse Electric Corporation, East Pittsburgh, Pa., a corporation of Pennsylvania
Filed Sept. 4, 1959, Ser. No. 838,255
13 Claims. (Cl. 219—131)

This invention relates to the art of arc-welding and has particular relationship to arc-spot or tack welding.

In arc-spot welding it is necessary that the time interval during which the welded metal is being deposited be measured out with reasonable precision. For this purpose it is necessary that a signal be derived from the welding apparatus which indicates precisely the start of the welding operation, that is, the start of the deposit of the weld metal. An arc-spot weld is started with the electrode displaced a predetermined distance from the work. In producing such a weld the practice is to cause the electrode to advance towards the work at a low inching speed; the contact of the electrode and the work firing the arc. In producing an arc-spot weld with a constant potential supply of the type that is disclosed in Bichsel Patent 2,786,160, for example, it has been found that in most situations the time interval between the contact of the electrode and the work and the firing of the arc is so short that the start of the deposit of weld metal may be signaled by the contact of the electrode and the work. This event may conveniently be signaled by the initiation of flow of current through the electrode and the work. While this invention may be applicable in certain situations to welding with constant current, that is, a relatively high impedance supply, it is particularly applicable in welding with a constant potential supply.

Arc-spot welding apparatus in accordance with the teachings of the prior art in which the timing of the deposit of weld metal during each spot is initiated on the initiation flow of current through the electrode and the work is typified by Morley Patent 2,845,824 and Cameron Patent 2,845,526. While the apparatus disclosed in these patents has been used widely and has proved highly satisfactory there are situations in which higher precision than is afforded by the Morley or Cameron apparatus is desirable and it is an object of this invention to provide such arc-spot welding apparatus.

It is an incidental object of this invention to provide a novel electronic timer particularly suitable for arc-spot welding but having other uses.

It is a more specific object of this invention to provide an electronic timer which shall produce both instantaneous operation of switch means or contacts and timed operations of other switch means or other contacts.

In accordance with one aspect of this invention the duration of the deposit of weld metal during each spot is timed by an electronic timer which is so coordinated with the apparatus which supplies the welding current that precise timing is achieved. The electronic timer includes a discharge device and a time constant network connected to control the conduction of he discharge device. The timer includes two relays one of which is connected to be actuated by conduction of the discharge device and the other of which is ot be actuated independently of the discharge device. At the start of a welding operation when the welding electrode contacts the work the relay actuatable independently of the device is actuated in response to the current flow between the electrode and the work and the timing out of the time-constant network is started. The network is so connected to the device that the charge on the network maintains the device non-conducting so long as the charge is above a predetermined magnitude. After the network has timed out the other relay is actuated and actuates the timed contacts. The first relay sets the apparatus to carry out the arc-spot welding operation, the second relay on being actuated terminates the spot welding operation.

At the end of an arc-spot welding operation the advance of the electrode towards the work is stopped while the welding power supply remains connected electrically to the electrode and the work. The arc then continues to burn with the electrode not moving so that the electrode is burned back. At the end of a predetermined time interval which may be called the burn-back interval the connection between the power supply and the electrode and the work is interrupted so that the arc is extinguished. At this time the electrode is burned back a predetermined distance from the work.

In accordance with a further aspect of this invention the burn-back interval is timed precisely by a second electronic timer coordinated with the arc spot timer. The interval timed by this timer is adjustable so that the electrode burn-back distance may be precisely set.

The facility to set the burn-back distance accurately over a range is important since such control can be made adaptable to the different welding conditions normally encountered. Previous apparatus used a fixed burn-back time which was a compromise between various conditions. A fixed time which is a compromise may be inadequate for a certain application. Under certain conditions the fixed time may be too long or too short, resulting in a burn-back (too long) or in the electrode sticking in the pool at the end of the weld.

The novel features considered characteristic of this invention are disclosed generally above. The invention itself both as to its organization and as to its method of operation together with additional objects and advantages thereof will be understood from the following description of specific embodiments of this invention when taken in connection with the accompanying drawings in which.

Figure 1:
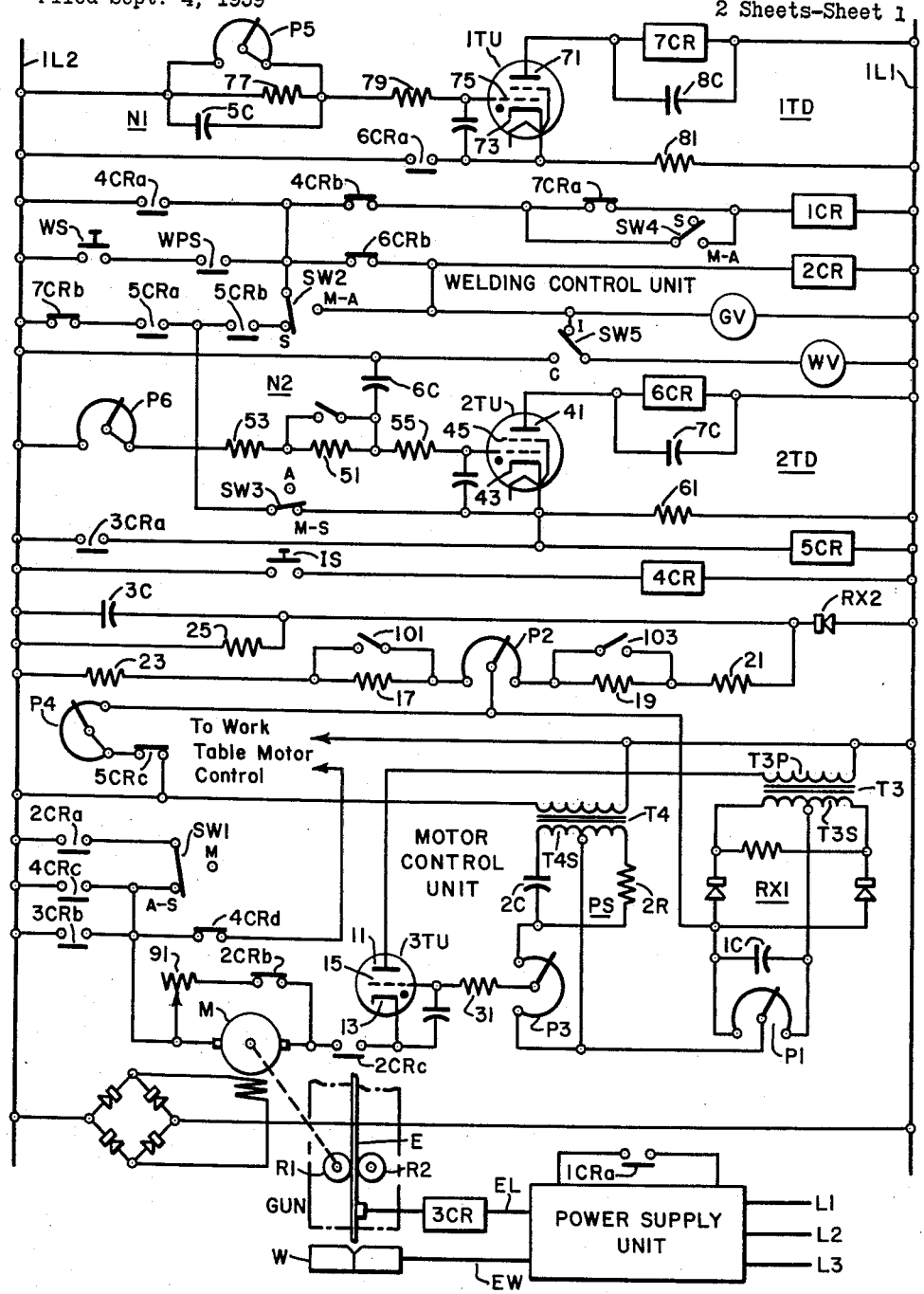
FIG. 1 is a schematic showing a preferred embodiment of this invention.
Figure 1A:
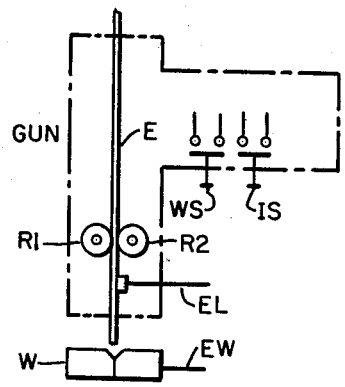
FIG. 1A is a diagrammatic view of the torch used in the practice of this invention.

The apparatus shown in the drawings is a welding system including a GUN, a POWER SUPPLY UNIT, a MOTOR CONTROL UNIT and a WELDING CONTROL UNIT. This division of the apparatus is in accordance with functions rather than structures and is adapted to facilitate the description of the invention. The system shown in FIG. 1 is adapted to be energized through power conductors L1, L2 and L3 which are adapted to be connected through the usual disconnects or circuit breakers (not shown) to a commercial polyphase supply and through control conductors 1L1 and 1L2. Conductors 1L1 and 1L2 may be energized through voltage reducing transformers from two of the conductors L1, L2 and L3 or directly to the commercial supply through disconnects or circuit breakers (not shown). The apparatus may be used for manual or automatic continuous welding or for spot welding and for this purpose selector switches SW1, SW2, SW3 and SW4 are provided; the switches SW1, SW2, SW3 and SW4 may be set for manual, M; automatic, A, or spot, S, as indicated on the switches. Since this invention concerns itself primarily with spot welding, the switches shall be regarded as set to spot welding, S, in considering the following description of the structure and operation of the apparatus. There is also a switch SW5 which may be set so that the cooling water is supplied intermittently, I, or continuously, C. In the description of the structure and operation of this invention the switch SW5 will be assumed to be set for intermittent control of the cooling water.

In the usual practice of this invention, the GUN is of the type disclosed in Miller Patent 2,806,125 or Bichsel Patent 2,813,193. Such a GUN includes a channel through which an electrode E is advanced to work W. The electrode is driven by a motor M through drive rolls R1 and R2. The GUN also includes cooling channels and channels for transmitting a shielding gas to the arc. The GUN also includes an inching switch IS and a starting switch WS.

The POWER SUPPLY UNIT preferably is of the type disclosed in Bichsel Patent 2,786,160. This UNIT is energized from conductors L1, L2 and L3 and produces direct-current potential when so energized between conductors EL and EW. Conductor EL is adapted to be connected to the electrode E and conductor EW to the work W. The electrode conductor EL is connected to the electrode E through the coil of a current relay 3CR; this coil may in fact be a loop in the conductor EL. The current relay 3CR has front contacts 3CRa and 3CRb which are connected respectively to control the operation of the WELDING CONTROL UNIT and the MOTOR CONTROL UNIT.

The POWER SUPPLY UNIT may be connected in energizing relationship with the conductors EL and EW by actuation of a contactor (not shown). In the apparatus disclosed in Bichsel Patent 2,786,160 this contactor is identified by the numeral 179 in FIG. 1. The contactor which connects the POWER SUPPLY UNIT in energizing relation with EL and EW is actuable by the front contact 1CRa of a relay 1CR in the WELDING CONTROL UNIT.

The MOTOR CONTROL UNIT includes a thyratron 3TU having an anode 11, a cathode 13 and a control electrode or grid 15. The anode 11 is connected to conductor 1L1 through the primary T3P of a current transformer T3. The cathode 13 is adapted to be connected to conductor 1L2 through the front contact 2CRc of a relay 2CR in the WELDING CONTROL UNIT, the motor M and alternatively, through the front contact 3CRb, the front contact 4CRc of a relay in the WELDING CONTROL UNIT, which operates during inching, and the front contact 2CRa. The secondary T3S of the current transformer T3 supplies a capacitor 1C through a full wave rectifier RX1. A variable resistor P1 is connected across the capacitor 1C and a potential depending on the setting of the variable resistor P1 is derivable. This potential depends on the current conducted by the thyratron 3TU through the motor M and serves to set the IR drop compensation of the motor M.

The MOTOR CONTROL UNIT also includes a phase-shift network PS consisting of a transformer T4 across the secondary of which a capacitor 2C and a resistor 2R are connected in series. A variable resistor P3 is connected between a center tap of the secondary T4S and the junction of the resistor 2C and capacitor 2R. An alternating current voltage of a magnitude determined by P3 displaced in phase with reference to the potential between 1L1 and 1L2 in accordance with the relationship of 2C and 2R is thus derivable from P3.

The MOTOR CONTROL UNIT also includes facilities for impressing a bias potential in the control circuit of 3TU. This includes a capacitor 3C charged through a rectifier RX2 from conductors 1L1 and 1L2. A plurality of resistors are connected across the capacitor, these include a variable resistor P2 and resistors 17, 19, 21, 23 and 25, two of which, 17 and 19, may be shunted out in the low or high speed settings respectively of the MOTOR CONTROL UNIT. These resistors determine the portion of the potential derivable from the capacitor 3C which is impressed during normal operation in the control circuit of 3TU as bias tending to increase the conductivity of 3TU. The control circuit of 3TU for normal operation includes the control electrode 15, a grid resistor 31, the lower portion of the resistor P3, the left-hand portion of the resistor P1, the left-hand portion of resistor P2 and its associated resistors 17 and 23, one of the contacts 3CRb, 4CRc or 2CRa, the motor M, the contact 2CRc and the cathode 11 of the thyratron 3TU. During inching and also during the start of a spot welding operation the speed of the motor M is set by variable resistor P4 which shunts P2, 17 and 23 through the bank contact 5CRc of a relay 5CR in the WELDING CONTROL UNIT. The control circuit of 3TU for inching and starting extends from the control electrode 15 through grid resistor 31, P3, P1, P4, 5CRc, shunted by left-hand portion of P2, 17, 23 any one of 2CRa, 4CRc, 3CRb, M, 2CRc, 13, 3CRb, 4CRc and 2CRa, the motor M, the contact 2CRc, the grid and the cathode.

The WELDING CONTROL UNIT includes a spot timer 2TD, a burn-back timer 1TD, both of which are electronic for precision, gas and water valves GV and WV for the inert gas and cooling water respectively supplied to the GUN, a water pressure switch WPS and an inching relay 4CR. The WELDING CONTROL UNIT also includes the starting relay 2CR and the relay 1CR which actuates the contactor (not shown) in the POWER SUPPLY UNIT.

The timer 2TD includes a thyratron 2TU having an anode 41, a cathode 43 and a control electrode 45. The timer 2TD also includes a time-constant network N2 consisting of a capacitor 6C shunted by a variable resistor P6 and a plurality of fixed resistors 51 and 53, one of which 51 may be shunted out for short interval timing. The timer 2TD also includes relays 5CR and 6CR. Relay 5CR has a plurality of front contacts 5CRa and 5CRb and the back contact 5CRc, the relay 6CR has a front contact 6CRa and a back contact 6CRb.

The anode 41 of 2TU is connected to conductor 1L1 through the coil of relay 6CR. This coil is shunted by capacitor 7C which prevents chattering and assures that once the relay 6CR is actuated it remains actuated. Thus, positive control of the termination of the spot time is assured. The cathode 43 of 2TU is adapted to be connected to conductor 1L2 through front contact 3CRa. The control electrode 45 of 2TU is connected to 1L2 through a grid resistor 55 and the network N2. The coil of 5CR is adapted to be connected between 1L2 and 1L1 through 3CRa.

Figure 2:
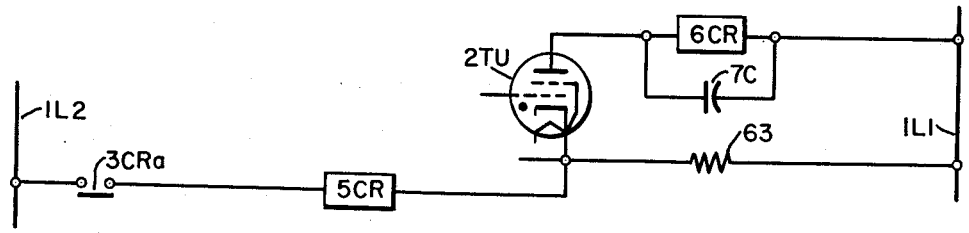
FIGS. 2 and 3 are fragmental schematics showing modifications of this invention.
Figure 3:
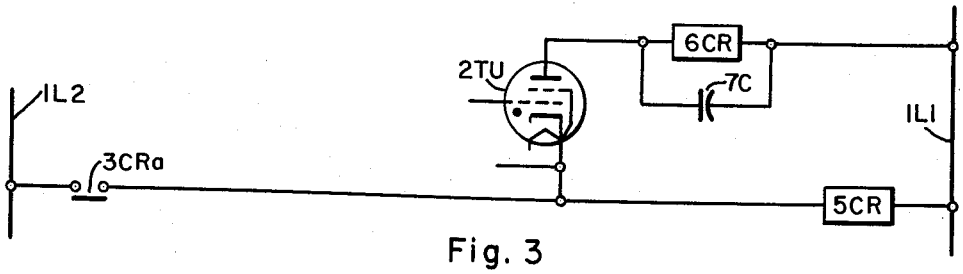

In the apparatus shown in FIG. 1 the coil of 5CR is connected between the cathode 43 and 1L1. The coil may also be connected as shown in FIG. 2 between the cathode 43 and the contact 3CRa. Both in the apparatus shown in FIG. 1 and in the apparatus shown in FIG. 2 a resistor 61 and 63, respectively, is connected between the cathode and conductor 1L1. The resistor 61 may be omitted in the embodiment of this invention shown in FIG. 1, as shown in FIG. 3. The impedance of the resistor 61 and of the coil of 5CR control the reset time of 2TD after it has performed a timing function. The resistor may have a resistance of about 10,000 ohms and the coil of the relay 5CR usually has a like impedance. Thus by including both the resistor 61 and the coil of 5CR between the cathode 43 of 2TU and 1L1 as in FIG. 1, the reset time may be substantially reduced. In the modification of the invention shown in FIG. 2 the resistor 63 limits the current to the coil of 5CR. In addition, it is desirable that the coil have a relatively low impedance. Accordingly, where the modification shown in FIG. 2 is used, the relay 5CR should pick up for relatively low current of the order of 10 milliamperes.

The timer 1TD includes a thyratron 1TU having an anode 71, a cathode 73 and a control electrode 75. This timer also includes a relay 7CR having back contacts 7CRa and 7CRb. In addition, the timer 1TD includes a time-constant network N1 including a capacitor 5C shunted by a variable resistor P5 and a fixed resistor 77.

The anode 71 of 1TU is connected to conductor 1L1 through the coil of 7CR. The coil is shunted by a capacitor 8C which prevents chattering. The cathode 73 of 1TU is adapted to be connected to conductor 1L2 through contact 6CRa. The control electrode 75 of 1TU is connected to 1L2 through a grid resistor 79 and network N1. A resistor 81 of a magnitude depending on the characteristics of the thyratron 1TU is connected between the cathode 73 and 1L1.

Relay 1CR has only the contact 1CRa. The coil of 1CR is adapted to be connected between conductors 1L1 and 1L2 through back contact 7CRa, back contact 4CRb and alternatively front contact 4CRa, switches WS and WPS and, with SW2 set for spot S, 5CRb, 5CRa and 7CRb. Relay 2CR has the front contacts 2CRa and 2CRc and the back contact 2CRb. The coil of 2CR is adapted to be connected between conductors 1L2 and 1L1 through the starting switch WS, the water switch WPS and back contact 6CRb. Alternatively, this coil may be connected between 1L2 and 1L1 through front contact 4CRa and back contact 6CRb or 7CRb, 5CRa and 5CRb. The solenoid for valve GV is in parallel with the coil of 2CR and is controlled in the same manner. In the intermittent setting of the apparatus, the solenoid of valve WV is in parallel with 2CR and controlled in the same manner.

Contacts 5CRa and 5CRb serve as lock-in contacts for 1CR, 2CR, GV and WV to prevent these relays and solenoids from being deenergized by the opening of WS once the timing out of 2TD starts. Contact 7CRb causes 1CR, 2CR, GV and WV to be deenergized at the end of the burn-back interval.

Relay 4CR has front contacts 4CRa and 4CRc and back contact 4CRb. The coil of this relay is adapted to be connected between conductors 1L2 and 1L1 to the inching switch IS.

In the stand-by condition of the apparatus, the electrode E is threaded into the GUN and the disconnects or circuit breakers (not shown) are closed so that there is power on conductors L1, L2, L3 and 1L1 and 1L2. Switches WS and IS are open, and 1CR, 2CR, GV, WV and 4CR are deenergized. 1CRa is then opened and the POWER SUPPLY UNIT is deenergized so that there is no current through conductor EL, 3CR is then deenergized. With 3CRa, 4CRc, 3CRb and 2CRc open, thyratron 3TU and motor M are deenergized. With 2CRb closed, a braking resistor 91 is connected across the motor M. With 3CRa open, the anode circuit of thyratron 2TU is open and 2TU is non-conducting, 6CR is deenergized, but there is potential between the control electrode 45 and the cathode 43 from 1L2 through network N2, grid resistor 55 and the resistor 61 and the coil of 5CR in parallel. During the intervals when 1L2 is electrically positive relative to 1L1 current flows between the grid and the cathode of 2TU charging 6C. 6C is charged with its plate electrically nearest the control electrode 45 negative and its other plate positive. The time taken by 6C to charge to the peak of the potential between 1L2 and 1L1 is determined by the impedance or resistance of 5CR and the resistor 61 combined.

With 3CRa open 5CR is deenergized. With 6CRa open thyratron 1TU is deenergized and 7CR is deenergized. Capacitor 5C of network N1 is charged similarly to the capacitor 6C of network N2.

To use the apparatus the eletcrode E is properly set in the GUN for welding. For this purpose the inching switch IS may be closed during short intervals. The closing of the inching switch actuates 4CR, closing 4CRa and 4CRc and opening 4CRb. The opening of 4CRb prevents energization of the POWER SUPPLY UNIT. The closing of 4CRa actuates 2CR closing and opening 2CRb. At this time 5CR is deenergized and 5CRc is closed. The thyratron 3TU is then energized at instants in the periods of the supply 1L1—1L2 determined by the setting of P4 and P2. P4 and P2 are so set that the thyratron 3TU is energized late in the periods of the supply so that a relatively small current is supplied to motor M. The motor is then energized to operate at a low speed and the electrode E is advanced through the GUN at a relatively low speed. The switch IS may be maintained closed or closed repeatedly until the electrode E is in the desired position in the nozzle of the GUN.

Once the electrode E is properly set, the GUN is disposed adjacent to the work W or mounted adjacent to the work and the switch WS is closed. If the water pressure is at this time adequate, WPS is also closed. The closing of WS then actuates 1CR so that the POWER SUPPLY UNIT is energized and potential appears between EL and EW but at this time E is spaced from the work W so that there is no current through EL and EW. The closing of WS also energizes GV and WV opening the gas and water valves and supplying shielding gas and cooling water to the GUN. In addition 2CR is actuated opening 2CRb and closing 2CRa and 2CRc. At this time 5CRc is still closed so that the electrode E is advanced towards the work W at a low speed. When the electrode E contacts the work W current flows through 3CR; 3CRa is then closed. This connects the cathode of 2TU to the conductor 1L2 stopping the charging of 6C. 6C then begins to discharge through P6 and the resistors 51 and 53 in series with it. At the same time the anode-cathode circuit of 2TU is closed but N2 is connected between the control electrode 45 and the cathode 43 with the electrically negative plate of 6C connected to the control electrode 45. The charge on N2 blocks 2TU so long as it remains at a predetermined magnitude. The discharging of N2 starts the timing out of the timer 2TD.

Since the POWER SUPPLY UNIT is of the constant potential type, the arc is fired instantaneously when the electrode E contacts the work W and the start of the timing on the closing of the current relay 3CR following the contact of the electrode E and the work W does not materially affect the accuracy of the weld timing. This is governed by 2TD which is highly accurate. With the arc fired the deposit of the weld metal from the electrode E starts, and with the network N2 discharging and the thyratron 2TU non-conducting, this deposit continues.

The closing of 3CRa also instantaneously actuates 5CR. 5CRa and 5CRb are then closed. The switches WS and WPS are then shunted by 7CRb, 5CRa and 5CRb and the opening of the switch WS does not affect the welding operation. In addition, the opening of 5CRc disconnects P4 from the control circuit of thyratron 3TU and thereafter the conduction of 3TU and the speed of the motor M and speed of feed of electrode E are determined by the setting of P2 and the setting of the switches 101 and 103 shunting 17 and 19. This setting is such that the motor M operates at the welding speed which is dependent on the character of the electrode E and the work W.

The welding now continues until N2 times out. Since 7CRb and 5CRa are closed, the cathode of 2TU is connected to 1L2 through 7CRb and 5CRa and the timer 2TD is not affected by the position of WS or by any instantaneous decrease in current of the arc which might cause 3CR to drop out momentarily. With this arrangement, if the arc is extinguished for a fraction of a second the timer will continue to time and the arc will restrike continuing the weld for the original time period.

The locking in of 2TD by 7CRb and 5CRa is necessary because it was found that the electronic timer 2TD resets very quickly. Without 3CRa shunted by 7CRb and 5CRa, an extremely short arc outage causes relay 3CR to break for an instant, resets 2TD and starts the time period all over when 3TD closes again. This means that the time period of the weld would be much greater than the setting since the time before the arc outage is added to the new time period. This variation in the timing is especially important where a dynamic reactor is used with the constant potential welding apparatus since the low current operation possible with the reactor usually results in a much more erratic current flow in the arc. 7CRc and 5CRa prevent this improper timing.

The discharge of N2 to a point where 2TU becomes conducting marks the timing out of 2TD. At this point 6CR is actuated closing 6CRa and opening 6CRb. The closing of 6CRa starts the timing out of the burn-back timer 1TD. The opening of 6CRb causes 2CR to be deenergized opening 2CRa and 2CRc and closing 2CRb. This deenergizes motor M instantaneously stopping the feed of the electrode E to the work W. But 1CR remains actuated and 1CRa closed so that the POWER SUPPLY UNIT continues energized and there is potential between the conductors EL and EW. The arc then continues to burn and the electrode E is burned back.

As the electrode E is burned back the current flowing through EL may be reduced to a point where 3CR drops out but this does not affect the conduction of 2TU since 7CRb and 5CRa constitute a lock-in circuit across 3CRa.

The burn-back thus continues until 1TD times out and 1TU becomes conducting. 7CR is then actuated; this opens 7CRa causing 1CR to become deenergized and interrupting the arc between the electrode A and work W. The burn-back interval is at this time terminated. It is usually desirable that the burn-back be precise, and to achieve the precision P5 may be set to produce just the desired burn-back interval. When 1TD times out, 7CRb also opens. Since 3CRa is at this time open, 2TU is deenergized resetting 6CR and N2, if WS is open. When 6CR becomes deenergized, 6CRa opens resetting 1TD. 5CR is also deenergized and with 2CR, 5CR and 4CR reset, the MOTOR CONTROL UNIT is also reset. The apparatus is now set for another operation.

If WS is still held closed when 1TD times out, the resetting of 2TD is prevented because the anode-cathode circuit of 2TU remains closed through 5CRb, WPS and WS, and 2TU continues to conduct. To start a new spot welding operation WS must be reopened to reset 2TD and then reclosed. Quick reset of 2TD is desirable to suppress double cycling and for this resistor 61 is of importance.

The invention disclosed herein is in accordance with one of its important aspects an arc-spot welding system particularly suitable for use with a POWER SUPPLY UNIT of the constant potential type in which highly precise timing of the deposit of metal during the welding interval and of the burn-back are achieved. One of the important features of this invention is a novel electronic spot timer which is correlated in a novel manner with the welding apparatus and the burn-back timer and which includes among other features provisions for preventing the interruption of the spot timing when during the burn-back interval the welding current which sets the spot timer in its timing out operation becomes so low as not to be capable of maintaining the spot timer timing out.

While preferred embodiments of this invention have been disclosed herein, many modifications thereof are feasible. This invention then is not to be restricted except insofar as is necessitated by the spirit of the prior art.

We claim as our invention:

1. Arc welding apparatus for welding work with a consumable electrode with power supplied from power-supply conductors comprising, means connected to said conductors for connecting said conductors in energizing relationship with said electrode and work, means to be connected to said electrode for advancing said electrode toward said work, circuit means connected to said advancing means for energizing said advancing means to advance said electrode at a low speed and including normally-open switch means to be closed for increasing the energization of said advancing means so that it advances said electrode at welding speed, an electric discharge device having an anode, a cathode and a control electrode, a timing network, means connected to said network and to said conductors for charging said network, means connected to said network and said device, responsive to the engagement of said electrode and work when said electrode is being advanced at said low speed and while said electrode and work are energized from said conductors for connecting said network to said control electrode so that the charge therein blocks conduction between said anode and cathode of said device and substantially simultaneously for closing said switch means and for discharging said network, so that after said network has discharged to a predetermined charge, current is conducted between said anode and cathode, and means responsive to the conduction of said current between said anode and cathode for interrupting the energization of said advancing means.

2. Arc welding apparatus for welding work with a consumable electrode with power supplied from power-supply conductors comprising, means connected to said conductors for connecting said conductors in energizing relationship with said electrode and work, means to be connected to said electrode for advancing said electrode toward said work, circuit means connected to said advancing means for energizing said advancing means to advance said electrode at a low speed and including normally open switch means to be closed for increasing the energization of said advancing means so that it advances said electrode at welding speed, an electric discharge device having an anode, a cathode and a control electrode, a timing network, means connected to said network and to said conductors for charging said network, means connected to said network and said device responsive to the engagement of said electrode and work when said electrode is being advanced at said low speed and while said electrode and work are energized from said conductors for connecting said network to said control electrode so that the charge therein blocks conduction between said anode and cathode of said device and substantially simultaneously for closing said switch means and for discharging said network, so that after said network has discharged to a predetermined charge, current is conducted between said anode and cathode, and means responsive to the conduction of said current between said anode and cathode for interrupting the connection of said conductors to said electrode and work.

3. Arc welding apparatus for welding work with a consumable electrode with power supplied from power-supply conductors comprising, means connected to said conductors for connecting said conductors in energizing relationship with said electrode and work, means to be connected to said electrode for advancing said electrode toward said work, circuit means connected to said advancing means for energizing said advancing means to advance said electrode at a low speed and including normally-open switch means to be closed for increasing the energization of said advancing means so that it advances said electrode at welding speed, an electric discharge device having an anode, a cathode and a control electrode, a timing network, means connected to said network and to said conductors for charging said network, means connected to said network and said device responsive to the engagement of said electrode and work when said electrode is being advanced at said low speed and while said electrode and work are energized from said conductors for connecting said network to said control electrode so that the charge therein blocks conduction between said anode and cathode of said device and substantially simultaneously for closing said switch means and for discharging said network, so that after said network has discharged to a predetermined charge, current is conducted between said anode and cathode, a timer having an adjustable timing interval, means responsive to the conduction of said current between said anode and cathode for interrupting the energization of said advancing means, and for starting the timing out of said adjustable timer, and means responsive to the timing out of said timer for interrupting the connection of said conductors to said electrode and work.

4. Timing apparatus including a pair of power-supply conductors, first and second electric discharge devices each having an anode, a cathode and a control electrode, first relay means having coil means and normally open contact means, second and third relay means each having coil means, normally open switch means, means connecting in series said conductors, said coil means of said first relay means, said anode and cathode of said first device and said switch means with said anode electrically nearer one of said conductors and said switch means and cathode electrically nearer said other conductor, a first time-constant network, means connecting said network between said other conductor and said control electrode of said first device, a first electrical component having substantial impedance connected between said cathode of said first device and said one conductor, means connecting in series said coil means of said second relay means said switch means and said conductors, means connecting in series said conductors, said anode and cathode of said second device, said coil means of said third relay means and said contact means with said anode electrically nearer one of said conductors and said contact means and said cathode electrically nearer the other of said conductors, a second time-constant network, means connecting said second network between said last-named other conductor and said control electrode of said second device, a second component of substantial impedance, and means connecting said component between said cathode of said second device and said last-named one conductor.

5. Timing apparatus including a pair of power-supply conductors, first and second electric discharge devices each having an anode, a cathode and a control electrode, first relay means having coil means and normally open contact means, second and third relay means each having coil means, normally open switch means, means connecting in series said conductors, said coil means of said first relay means, said anode and cathode of said first device and said switch means with said anode electrically nearer one of said conductors and said switch means and cathode electrically nearer said other conductor, a first time-constant network, means connecting said network between said other conductor and said control electrode of said first device, means connecting said coil means of said second relay means between said cathode and said first conductor, means connecting in series said conductors, said anode and cathode of said second device, said coil means of said third relay means and said contact means with said anode electrically nearer one of said conductors and said contact means and cathode electrically nearer the other of said conductors, a second time-constant network, means connecting said second network between said last-named other conductor and said control electrode of said second device, a component of substantial impedance, and means connecting said component between said cathode of said second device and said last-named one conductor.

6. A timer including power-supply means including a first conductor and second conductor, an electric discharge device having an anode, a cathode and a control electrode, a first relay having an actuating coil, a time constant network, normally open switch means, means connecting in series said first conductor, said second conductor, said anode, said cathode, said coil and said switch means with said anode electrically nearer said first conductor than said cathode and said switch means and cathode electrically nearer said second conductor than said first conductor, means connecting said network between said control electrode and said second conductor, a second relay having coil means, and means connecting said coil means between said cathode and said first conductor.

7. Arc-spot welding apparatus for welding work with a consumable electrode comprising power-supply means of the constant potential type for supplying power for welding, means connected to said power-supply means for connecting said supply means to conduct welding current through said electrode and work, a spot timer for timing the duration of a spot weld, said timer including an electric discharge device having an anode and a cathode and being connected in a timing circuit, said anode-cathode circuit being open in the standby condition of said timer and being closed to start a timing-out operation of said timer, said timer including first contact means actuable on the closing of said anode-cathode circuit and second contact means actuable on the timing out of said timer, means connected to said supply means and to said timer and responsive to the conduction of current between said electrode and said work for closing said anode-cathode circuit, means connected to said spot timer and responsive to the actuation of said first contact means for closing said anode-cathode circuit separately from said closing means so that said anode-cathode circuit remains closed even when said current between said electrode and said work is reduced to a low magnitude, a burn-back timer, means connected to said burn-back timer and to be connected to said electrode and responsive to the actuation of said second contact means for starting the timing out of said burn-back timer and the burn-back operation, and means connected to said burn-back timer and to said supply means and responsive to the timing-out of said burn-back timer for interrupting the connection between said supply means and said electrode and said work.

8. Arc-spot welding apparatus for welding work with a consumable electrode comprising power-supply means of the constant potential type for supplying power for welding, means connected to said power-supply means for connecting said supply means to conduct welding current through said electrode and work, a spot timer for timing the duration of a spot weld, said timer including an electric discharge device having an anode and a cathode and being connected in a timing circuit, said anode-cathode circuit being open in the standby condition of said timer and being closed to start a timing-out operation of said timer, means connected to said supply means and to said timer and responsive to the conduction of current between said electrode and said work for closing said anode-cathode circuit, means connected to said spot timer and responsive to the closing of said anode-cathode circuit for closing said anode-cathode circuit separately from said closing means so that said anode-cathode circuit remains closed even when said current between said electrode and said work is reduced to a low magnitude, a burn-back timer, means connected to said burn-back timer and to be connected to said electrode and responsive to the timing out of said spot timer for starting the timing out of said burn-back timer and the burn-back operation, and means connected to said burn-back timer and to said supply means and responsive to the timing-out of said burn-back timer for interrupting the connection between said supply means and said electrode and said work.

9. A timer including power-supply means, an electric discharge device having an anode, a cathode and a control electrode, a first relay, a second relay, a time-constant network, means connecting said network in charging relationship with said power-supply means, actuable means connected to said discharge device, said network, said charging means and said power-supply means when actuated operating substantially simultaneously;

(1) to interrupt the charging of said network so that said network starts to discharge,
(2) to connect said supply in energizing relationship with said anode and cathode and said first relay so that on conduction of said device said first relay is actuated, (3) to connect said network between said control electrode and cathode so that so long as the charge on said network is maintained above a predetermined magnitude said network blocks conduction of said device, and (4) to connect said second relay in energizing relationship with said supply so that said second relay is actuated immediately by actuation of said operating means, means connected to said second relay for starting a timed operation, and means connected to said first relay for terminating said timed operation.

10. A timer including an electric discharge device, timing means connected to said device when actuated to time out and while timing out maintaining said device non-conducting for a predetermined time interval and thereafter rendering said device conducting, means connected to said timing means for actuating said timing means to time out, and a relay connected to said device to be actuated when said device is rendered conducting, said timer being characterized by a second relay connected to said actuating means for said timing means, said second relay being actuable by said actuating means for said timing means simultaneously with said actuation of said timing means, said timing being further characterized by means connected to said second relay for starting a timed operation, and by means connected to said first relay for stopping said timed operation.

11. A timer including power supply-means including a first conductor and a second conductor, an electric discharge device having an anode, a cathode and a control electrode, a first relay having an actuating coil, a time-constant network, normally open switch means, means connecting in series said first conductor, said second conductor, said anode, said cathode, said coil and said switch means with said anode electrically nearer said first conductor than said cathode and said switch means and cathode electrically nearer said second conductor than said first conductor, means connecting said network between said control electrode and said second conductor, a component having substantial electrical impedance connected between said cathode and said first conductor, a second relay having an actuating coil, means connecting in series, said first conductor, said second conductor, said last-named coil and said switch means, means connected to said second relay for starting a timed operation, and means connected to said first relay for terminating a timed operation.

12. A timer including power-supply means including a first conductor and a second conductor, an electric discharge device having an anode, a cathode and a control electrode, a first relay having an actuating coil, a time-constant network, normally open switch means, means connecting in series said anode, said cathode, said coil and said first conductor, means including said switch means connecting said cathode to said second conductor, means connecting said network between said control electrode and said second conductor, a component having substantial electrical impedance connected between said cathode and said first conductor, a second relay having an actuating coil, means connecting in series, said first conductor, said second conductor, said last-named coil and said switch means, means connected to said second relay for starting a timed operation, and means connected to said first relay for terminating said timed operation.

13. Arc-spot welding apparatus for welding work with a consumable electrode comprising power supply means for supplying power for welding, means connected to said supply means for connecting said supply means to conduct welding current through said electrode and work, means to be connected to said electrode for advancing said electrode in welding engagement with said electrode and work, a spot timer for timing the duration of a spot weld, said timer including an electric discharge device having an anode, a cathode and a control electrode and, with reference to the conduction of current between said anode and cathode, having a first condition and a second condition, said timer also having current means connected to said control electrode for maintaining said device in said first condition during the standby condition of said apparatus; means to be connected to said advancing means for actuating said advancing means to advance said electrode in welding engagement with said work, means connected to said circuit means and responsive to the conduction of substantial current between said electrode and work for actuating said circuit means to carry out a timing operation during which said device is maintained in said first condition and at the end of which said device is converted to said second condition, means connected to said circuit means and responsive to said conduction of current for maintaining said actuation of said circuit means separately from said actuating means, and means responsive to said device when in said second condition and connected to said advancing means for interrupting said advance of said electrode.

References Cited in the file of this patent
UNITED STATES PATENTS

| | | |
|---|---|---|
| 2,339,750 | Bartholy | Jan. 25, 1944 |
| 2,540,115 | Hopkinson | Feb. 6, 1951 |
| 2,602,888 | Audier | July 8, 1952 |
| 2,635,165 | Spice | Apr. 14, 1953 |
| 2,845,526 | Cameron | July 29, 1958 |
| 2,900,573 | Large | Aug. 18, 1959 |